United States Patent [19]

Rosenstock et al.

[11] 4,159,413

[45] Jun. 26, 1979

[54] CONTACT WELDING MACHINE, PARTICULARLY FOR AUTOMATIC APPLICATION OF TINY CONTACT PLATES TO A SUBSTRATE CARRIER

[75] Inventors: Bernhard Rosenstock, Hanau; Karl Tröger, Bruchköbel, both of Fed. Rep. of Germany

[73] Assignee: W. C. Heraeus GmbH, Hanau, Fed. Rep. of Germany

[21] Appl. No.: 832,530

[22] Filed: Sep. 12, 1977

[30] Foreign Application Priority Data

Sep. 18, 1976 [DE] Fed. Rep. of Germany ....... 2642040

[51] Int. Cl.[2] ............................................. B23K 11/10

[52] U.S. Cl. ................................ 219/78.15; 219/56.1; 219/79; 219/80; 219/103

[58] Field of Search ................ 219/78.15, 79, 80, 103, 219/56.1, 56.21, 56.22; 228/13, 14, 15.1

[56] References Cited

U.S. PATENT DOCUMENTS

| | | | |
|---|---|---|---|
| 2,733,326 | 1/1956 | Tuller | 219/56.1 X |
| 2,749,420 | 6/1956 | Pityo | 219/79 |
| 3,300,617 | 1/1967 | Buck | 219/56.22 |
| 3,456,091 | 7/1969 | Warner | 219/56.1 X |
| 3,509,307 | 4/1970 | Gannone | 219/79 |
| 3,537,162 | 11/1970 | Kochan | 29/33 |
| 3,575,570 | 4/1971 | Gellatly | 219/78.15 X |

FOREIGN PATENT DOCUMENTS

| | | | |
|---|---|---|---|
| 909754 | 3/1954 | Fed. Rep. of Germany | 219/78.15 X |
| 1012711 | 7/1957 | Fed. Rep. of Germany | 219/78.15 X |
| 1439491 | 11/1968 | Fed. Rep. of Germany | 219/78.15 X |
| 2250461 | 1/1975 | Fed. Rep. of Germany | 219/78.15 X |

OTHER PUBLICATIONS

Schweissen und Schneiden, German Literature reference, (1960) vol. 10, pp. 438–446.

*Primary Examiner*—Richard R. Kucia
*Attorney, Agent, or Firm*—Frishauf, Holtz, Goodman & Woodward

[57] ABSTRACT

A transport drum is located adjacent two positions, one being a severing position in which a severing punch is located adjacent the drum to punch out contact plates in the order of at most 3 mm surface area from a strip of contact material, and place the punched-out plates in suitable openings formed at the circumference of the drum which, upon indexing rotation to the welding position, transports the plates thereto. Punch elements and welding electrodes have one portion of the elements located inside the drum, the other outside the drum adjacent the respective position. The contact carrier, for example in strip form, is fed to the drum, preferably tangentially, the contact plate being welded on the carrier at the welding position. Preferably, and simultaneously with the severing operation, the contact strip is deformed in advance of the severing so that the next subsequent severing operation will already accept a deformed element to provide a welding bump for concentrated application of spot welding current.

25 Claims, 10 Drawing Figures

CONTACT WELDING MACHINE, PARTICULARLY FOR AUTOMATIC APPLICATION OF TINY CONTACT PLATES TO A SUBSTRATE CARRIER

Reference to related prior art: German published application DT-AS No. 2 250 461.

DT-PS No. 909 754

DT-AS No. 1 012 711

DT-OS No. 1 439 491

US-PS No. 3 537 162

US-PS No. 3 509 307

Lit.: "Schweissen un Schneiden" (1960), Vol. 10, pp. 438–446.

The present invention relates to a contact welding machine and more particularly to a machine capable of automatically and rapidly applying electrical contact plates forming contact terminals on predetermined positions of a strip-formed carrier, in which the contact plates are tiny, that is, have a maximum surface dimension of 3 mm, and may have a much smaller dimension, that is, 1 mm, or less.

BACKGROUND AND PRIOR ART

It has previously been proposed to continuously supply electrical contacts to a substrate by severing contact elements from a strip of contact material either in wire or tape or band or strip form so that it can be welded on a substrate carrier made of sheet metal, or wire at predetermined positions on the carrier. The contact elements which have been cut off are guided through a contact guide path which extends from the cutting or severing device towards the welding position, providing a feed movement in forward direction and a retrace movement in backward direction having different lengths. In such an apparatus—see the referenced German publication DT-AS No. 2 250, 461—the contacts are applied to the welding point at an acute angle. The wire of contact material is held in a clamp. The wire pushes the severed contact element forwardly until it is positioned, as desired, on the substrate contact carrier.

The feed mechanism for such an arrangement is comparatively complex since the feed stroke is different for the forward feed and for the retrace; the guide path for the contact element itself is comparatively long resulting in a complex arrangement to insure accuracy. Consequently, the speed of application of contact elements to the substrate is limited.

One welding apparatus has an application in the order of from about 100 to 130 welds per minute, as advertised by the manufacturing firm Schlatter.

THE PRESENT INVENTION

It is an object to increase the operating speed of welding contact plates or contact elements on a carrier or substrate while providing an apparatus which is simple, consumes little space, and is capable of accurately handling even tiny contact elements. Further, it is desirable that the position of application of the contact plate on the substrate can be accurately maintained while permitting wide freedom to the designer in the shape of the contact plate itself.

Briefly, the apparatus includes a transport drum formed with contact plate receiving openings. The transport drum rotates, in index movement, between two positions: a severing position and a welding position. For severing, a punch is located outside of the drum and a counter-punch element inside the drum, adjacent a contact plate receiving opening which, at that time, will be at the severing position. The punched-out contact plate is then transported by the drum, while being located in the opening to the welding position. A welding electrode is located inside the drum and a counter electrode outside the drum. The substrate carrier is fed to the welding position. A synchronized operating arrangement is provided, operating both the counter punch element, and the welding electrode inside the drum so that the punching, or severing step and the welding step can be carried out when the drum is at the respective index position and has properly and accurately received the severed contact plate and then positioned the severed contact plate for welding.

In accordance with a preferred embodiment, the material from which the contact is made is first deformed to provide a welding bump or tip to concentrate spot welding current. The deformation step can be carried out conjointly with the severing step, the deformation tool being placed, however, in advance of the severing tool so that a portion of the contact material is deformed which is to be severed at the next stroke of the punch.

Drawings, illustrating an example:

Figure 10:
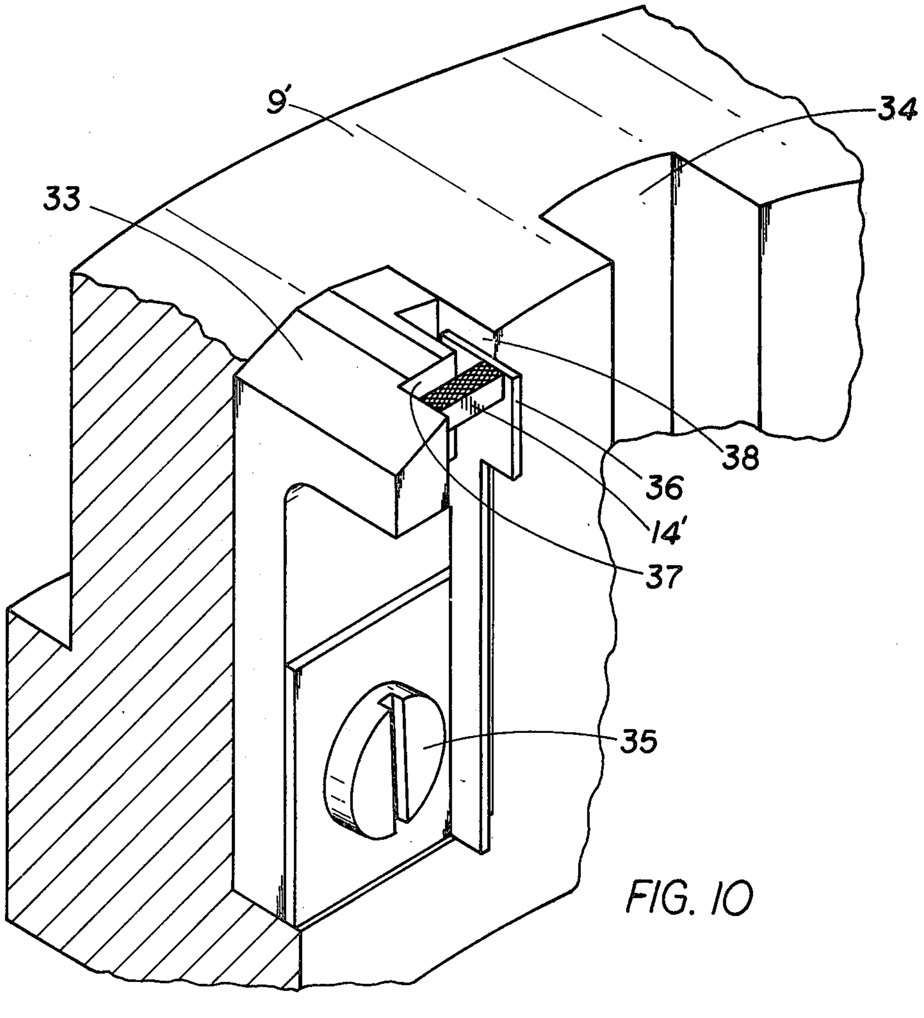

And FIG. 10 is a fragmentary perspective view of another embodiment of a plate receiving drum structure showing another way of forming the plate receiving opening in the drum.

Figure 1:
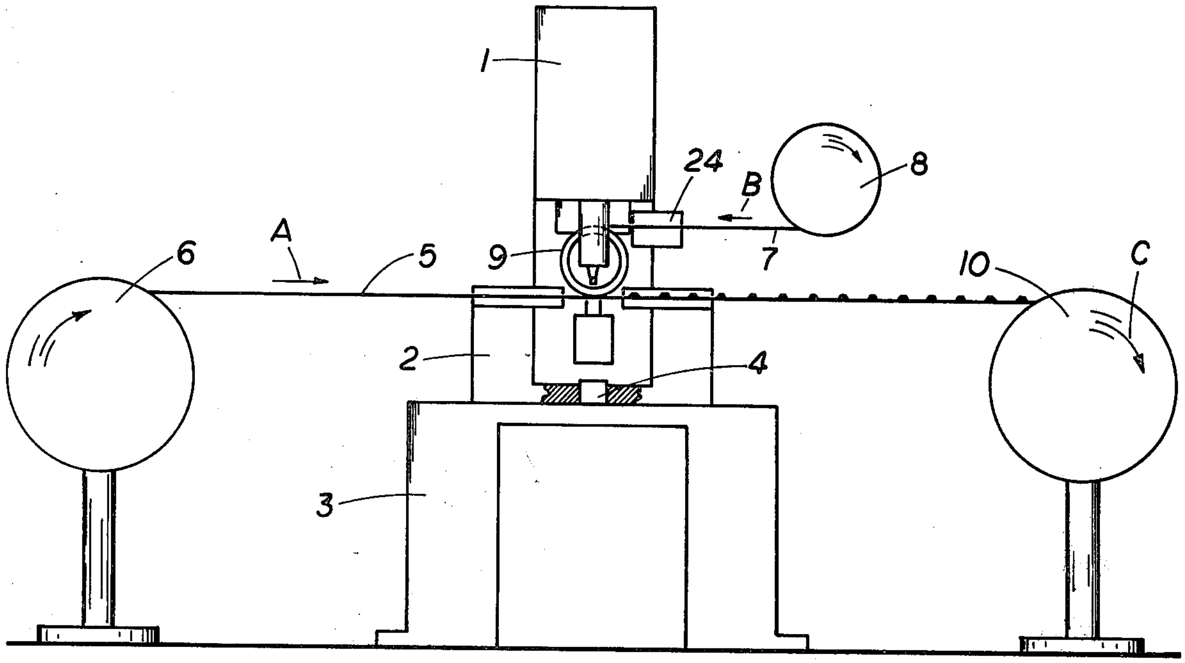
FIG. 1 is a highly schematic overall general view of the apparatus.

The apparatus (FIG. 1) has a spot welding unit 1 which is secured to a table 2 located on a suitable frame 3. The table 2 can be rotated about a vertical central axis passing through the welding unit 1. This provides a pivoting range of the table of 180° maximum. A substrate carrier material 5, in ribbon form, is supplied to the welding device in the direction of the arrow A. The ribbon or strip of substrate carrier is removed from a supply reel 6. Contact material 7 is removed in the direction of the arrow B from a contact material supply reel 8, preferably essentially parallel to the direction of movement of the strip 5. After welding of severed contact plates on the carrier strip, the carrier strip, with the contact plates applied is spooled on a take-up reel 10 which is rotated in the direction of the arrow C. Table 2 additionally includes an indexing-type feed means for the carrier 5, for example a step transport in the form of a Geneva cross, a transport mechanism similar to that of a motion picture transport, or the like. The feed mechanism for the strip 5 is synchronized with the rotary drive of a drum 9 and with an intermittent feed mechanism moving the contact plate strip 7, which may be similar to the movement mechanism for strip 5. Regardless of the type of mechanism employed, rotation of the drum 9 and feed of the plate strip 7 as well as of the carrier strip 5 is synchronized so that the two strips as well as the drum 9 are controlled to move over the same distance, as will be explained in detail below.

Figure 2:
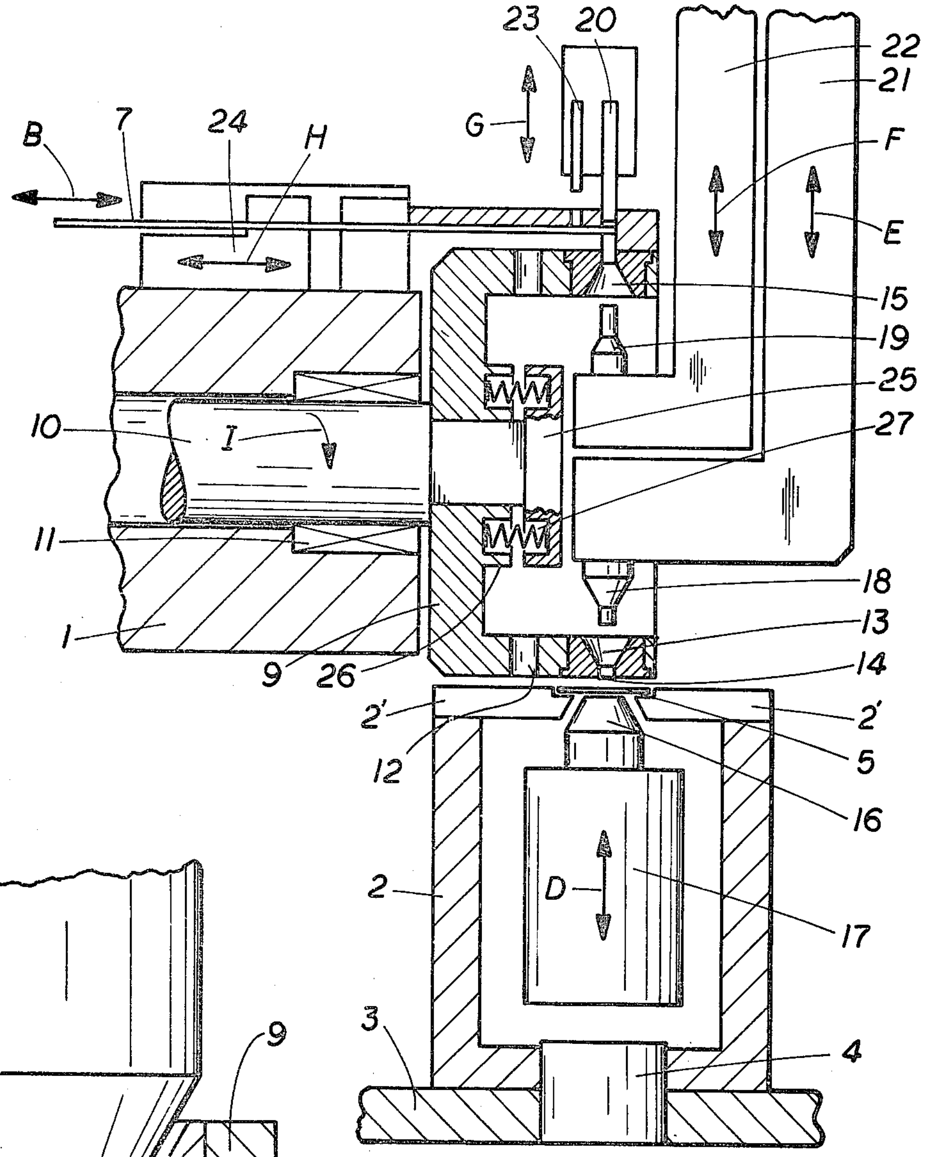
FIG. 2 is a schematic longitudinal cross section through the welding portion taken along a vertical axis of FIG. 1.

The welding unit is seen in an enlarged scale in FIG. 2. The double arrows indicate, respectively, the directions of movement of the respective parts. The drum 9 is fitted on a shaft 10 to be movable with respect thereto. Shaft 10 is horizontally journaled in precision bearings 11 of the welding unit 1. The drum 9 is formed with a bore 12 in which a centering pin can engage. The carrier strip 5 is located beneath the drum 9 and fed tangentially, guided by guides 2 (see FIG. 1). The drum 9 is formed with receiving opening 13 located at the circumference thereof to receive severed contact elements 14.

The receiving opening 13 formed at the circumference of the drum extends towards the interior thereof so as to be freely accessible from the interior; interiorly, the openings flare outwardly to form a conical surface which, towards the end portion, may merge into a cylindrical surface. The conical portion 15 can be engaged by similarly shaped elements as will appear.

A lower welding electrode 16 is located beneath the drum 9 and below the carrier strip 5 suitably secured to the table. Electrode 16 is vertically reciprocable, in the direction of the double arrow D by a suitable drive apparatus 17, secured to the table or to the frame. The reciprocating drive 17 may include, for example, a Scotch yoke. An inner electrode 18, having a conical surface matching that of the cone 15 of the opening 13 is located within the drum 9. Electrode 18 is secured to a holder 21 which is vertically reciprocable in the direction of the double arrows E, for example by a drive system similar to system 17. The electrodes 16, 18 are vertically aligned.

A counter 19 for a punch 20 is located on the same vertical axis as the welding electrodes 16, 18. The welding electrodes, together with their current supply (not shown) form a resistance welding or spot welding system, and, when opposite an opening 13, define a welding position. The counter element 19 is vertically reciprocable by attachment to a reciprocating holder 22. The holders 21, 22 operate in synchronism and can be controlled, for example, by a rotary drive with a cam which, additionally, can drive, or control, or be controlled by unit 17. The drive movements for the electrode 18 and for the punch counter element 19 are counter each other, that is, when the upper welding electrode moves downwardly, the punch counter 19 moves upwardly, the movement being shown by the double arrows F. The punch 20 moves in the direction of the double arrow G. Preferably, the punch 20 moves as a unit with deforming tool 23 with which it is combined as a single movable element. Again, the drive is synchronized and may be effected by suitable drive means, for example by a common cam shaft having suitably positioned cams. The strip 7 is fed by a feed device 24, moving the strip in the direction of arrow B and, itself, moving as shown in the double arrow H. FIG. 2 differs from the illustration of FIG. 1 in that the strip 7 is supplied at right angles to the supply direction of the strip 5. The severing punch 20 and the punch counter element 19, when aligned with an opening 13 of the drum 9 together define a severing position. The punch 20 is located above drum 9.

To compensate for possible play in drum 9 in extended periods of operation, a compensating resilient coupling is provided formed by a disk 25 secured to shaft 10 and a counter element 26 preferably unitary with the drum 9. A spring 27 is located between the elements 25, 26 of the coupling pressing drum 9 against an abutment on shaft 10. The spring 27 is, preferably, a plurality of axially placed spiral spring elements, circumferentially distributed with respect to shaft 10. The drum 9 can be centered with respect to the axis of shaft 10 by suitable bolts secured in openings 12 to thereby accurately set the centered position of the drum 9 and true operation of the drum 9 with respect to the axis of rotation of shaft 10.

During welding, the upper electrode 18 of the spot welding unit is dropped and the conical end thereof fits into the cone 15 of the opening 13 formed in a drum 9. Downward movement of the upper electrode 18 presses the severed contact 14 outwardly from the receiving opening 13 until it fits on the carrier strip 5 which, in turn, is supported by the counter electrode 16 at the obverse side thereof, to be thereby welded by resistance or spot welding to the carrier strip 5.

Figure 3:
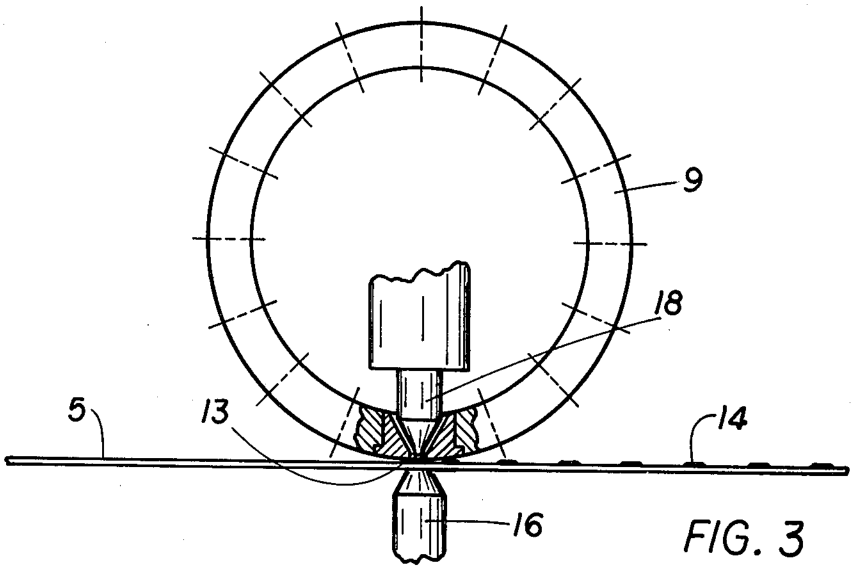
FIG. 3 is fragmentary schematic representation of the welding apparatus during welding, partly in section.

The spacing of the openings 13, schematically indicated by the center lines thereof in FIG. 3 is uniform about the circumference of the drum 9. Likewise, the recess distance of the openings 13 before merging into the cone, that is, the depths of reception of the plate 14 within the recess 13 of a drum 9 is uniform.

The strip 5 is formed with indexing openings or perforations 28 in which a step indexing movement control apparatus can engage to move the strip 5 in stepped increments. The strip 5 is moved in the same direction, as shown by arrow A, and is then spooled on the take-up reel, leaving the apparatus again in the same direction of the arrow A. Transport of the strip 5 is effected by a suitable mechanism located in table 2, and having pins or teeth engaging in the perforations 28 formed in the strip 5.

Figure 4:
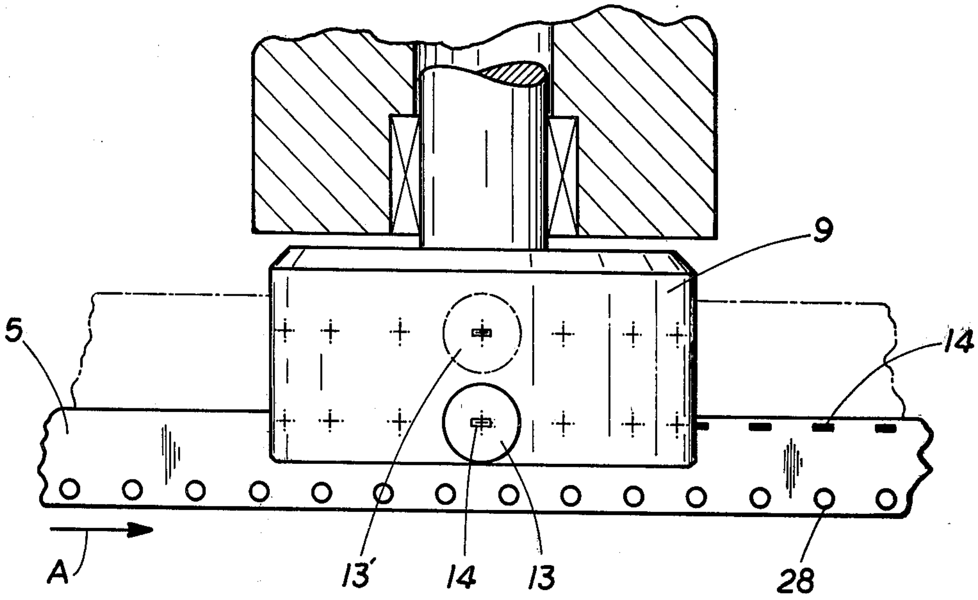
FIG. 4 is a top view, partly in section, of the welding arrangement and illustrating a carrier tape located therebeneath, in which a multiple-operation is shown.

FIG. 4 additionally shows by schematic representation of the center points of openings 13, 13' that the drum 9 may have more than one circumferential row of openings. The axial distance of the openings from the endface of the drum 9 is the same throughout. The centers of all the openings are located on a line which is parallel to the facing side of the drum. This insures accurate placement of the contact strips 14 with respect to the longitudinal edge of the carrier strip 5. The chain-dotted line of FIG. 4 symbolizes the maximum widths which the strip 5 can have and, in the embodiment shown, can receive a second row of contact plates placed in a second row of openings 13', the centers of which again are all located on a line parallel to the edge of the strip 5. This permits placement of a plurality of contacts on the strip 5 in adjacently located position. Of course, if the drum 9 is formed with a plurality of rows of openings, a plurality of respective welding systems including upper and lower electrodes, and punch systems, including punch and counter-punch elements must be provided.

Figure 5:
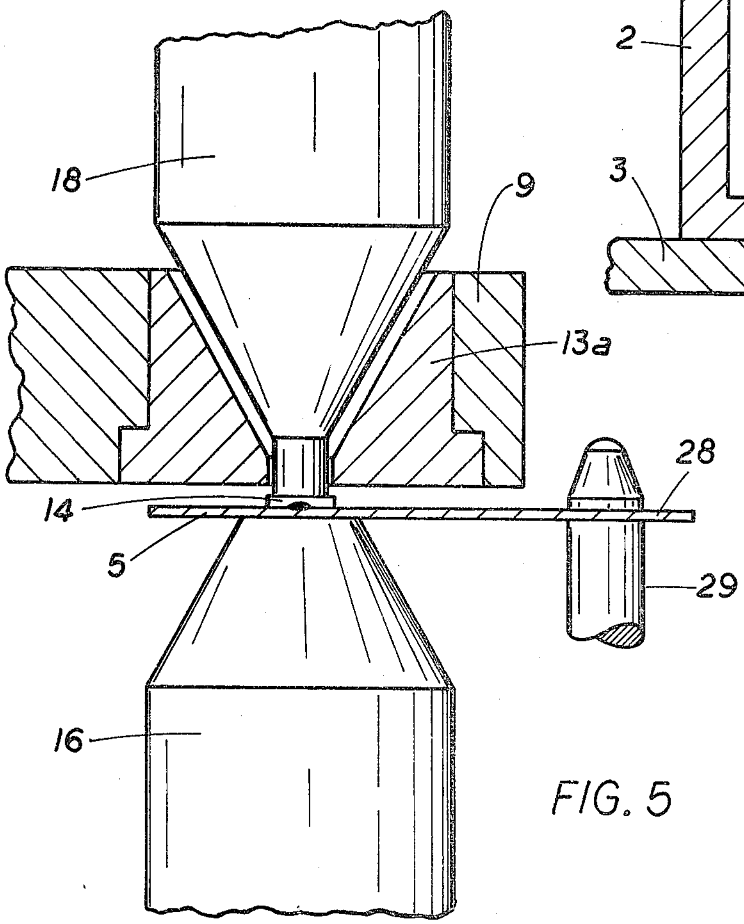
FIG. 5 is a schematic vertical half sectional view of the welding station and a portion of the carrier drum.

FIG. 5 shows the details of the welding system, and engagement of a transport pin 29 into a perforation 28 of the strip 5. The contact plate 14 has been deformed to perform a welding projection or tip or bump at the welding point. The welding bump is exactly centered with respect to the contact plate and the centerline of the electrodes which, in turn, are in vertial alignment. Thus, the welding position is accurately defined in a vertical plane, and with respect to a vertical line. FIG. 5 additionally shows that the drum 9 may be formed with separate insert elements 13*a*, in which the openings 13, themselves, are formed.

Figure 6:
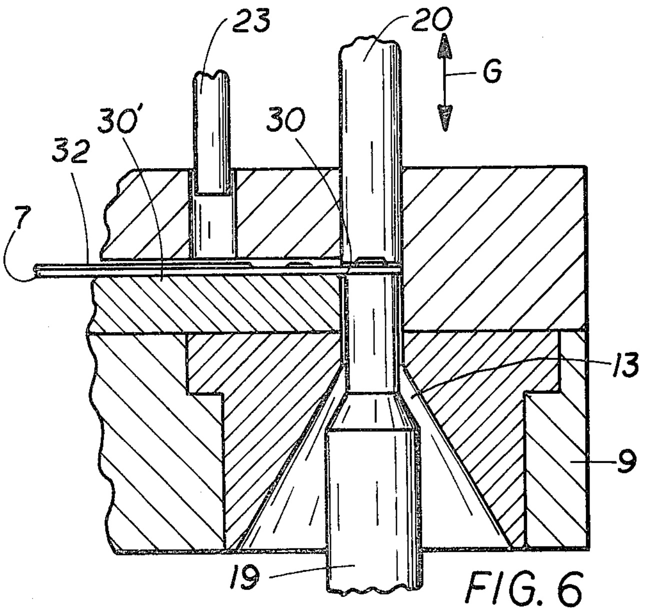
FIG. 6 is a fragmentary vertical sectional view of the severing station and further illustrating the deforming station.
Figure 7:
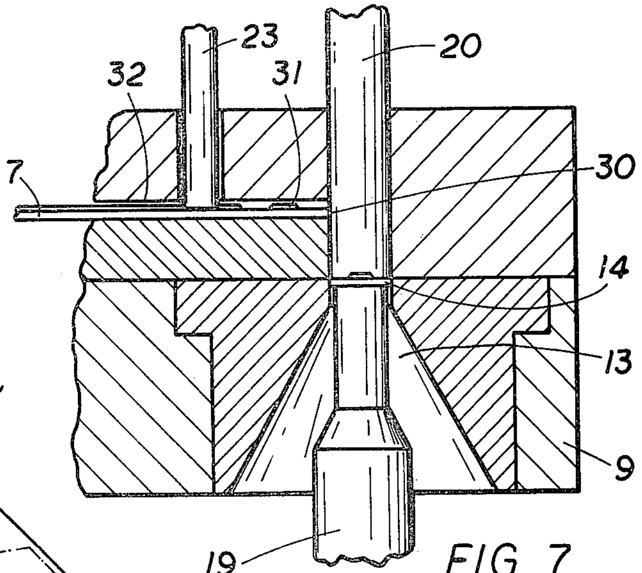
FIG. 7 is a view similar to FIG. 6 and showing application of a contact plate and deformation to form the welding bump, and introduction of the welding plate into the receiving opening of the drum.

The severing position is best seen in FIGS. 6 and 7. FIG. 6 shows supply of a strip of contact plate material. The contact plate material is in band or ribbon form, or may be in wire or raw form. It is supplied throughh a punch apparatus which includes a severing punch 20. It is preferably horizontally fed thereto, the punch 20 operating in vertical direction as shown by arrows G (FIG. 2). The punch counter element 19 likewise reciprocates in a vertical direction. Comparison of FIGS. 6 and 7 illustrates operation of the punch at the punch station. Up and downward movement of the punch 20 severs plate 14 from the contact material 7 by movement against a cutting edge 30, simultaneously pushing the thus severed plates into the receiving openings 13 in drum 9 positioned immediately below the punch. The severing edge 30 is preferably defined by a separate element 30' made of specially hard cutting material for cooperation with a punch 20.

Figure 9:
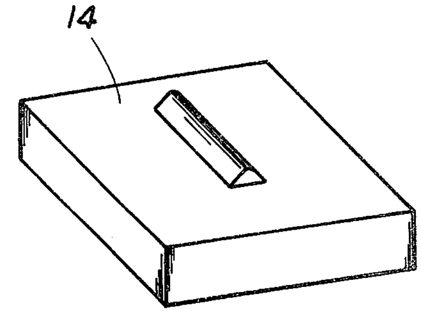
FIG. 9 is a perspective of a single contact plate.
Figure 8:
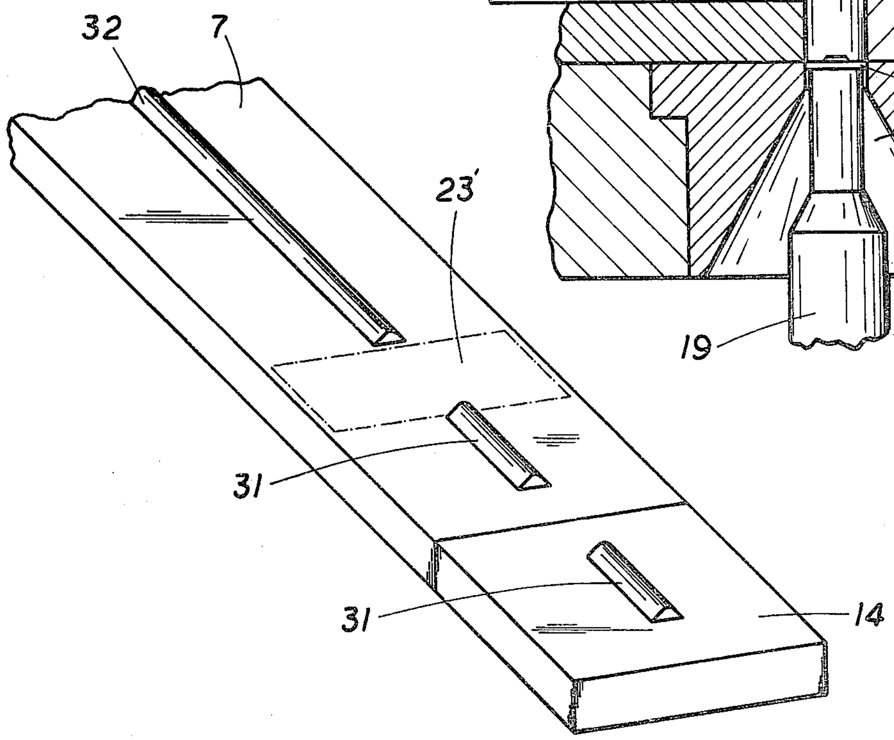
FIG. 8 is a perspective of the contact plate strip with deformations thereon.

The strip 7, as best seen in FIG. 8, is flat and formed with a ridge 32 thereon. The ridge 32 is flattened by the deformation punch 23 to leave a welding bump 31, so that the eventually severed plate will look as seen in FIG. 9. To flatten the ridge 32, the deformation element 23 is moved downwardly, conjointly with punch 20. FIG. 7 illustrates generation of the bump 31—accurately centered on the eventual plate 14. The deformation punch 23 has a width which leaves a remaining bump 31, when the plate is severed intermediate of the deformed ridge 32, such that the bump 31 is centered, and located by uniform distances from respective edges of the plate 14. The area engaged by the punch 23 is shown in FIG. 8 at 23'. The indexing or step feed of the strip 7 provides for uniform positioning of the bump 31 on the strip 7 when the individual bumps 31 are formed. The bumps 31 have the advantage to better conduct welding current and to distribute welding current during the spot welding operation.

Operation: the welding station itself operates in accordance with a well known resistance or spot welding method. The substrate carrier 5 will be any suitable material, for example a resilient, springy material, magnetic material for use in magnetic reed switches, or the like. Upon removal of strip material from the feed reel 6 by the feed mechanism, supply reel 8 for the contact plate material is likewise operated to supply contact strip, or contact wire by the length of one contact plate to the punch 20. Drum 9 will then rotate by an angle corresponding to the distance between two receiving openings 13 (see FIG. 3). Upon on first engagement of the strip 7 with deformation punch 23, the strip 14 is prepared, or pre-deformed to provide the welding bump 31. Thereafter, upon subsequent feed of the strip 7, in steps, to the punch 20, the plate 14 is severed from strip 7 and pressed into the opening 13. Upon rotation of drum 9 in counter clockwise direction (FIG. 1), in indexing movement, the plate will eventually reach the welding position (FIG. 2) in which the plate 14 is presented with the welding bump 31 facing downwardly, and positioned accurately with respect to the substrate or carrier strip 5. When the drum, in steps, has reached the welding position, the electrodes are moved in the direction of the respective arrows D and E towards each other. The welding electrode 18 enters into the opening 13 and engages the plate 14, under control of drive 21. Welding electrode 16 is driven by drive 17 in opposite direction. Electrode 18 presses the plate 14 against the strip 5 and current is passed between the electrodes to weld the plate to the strip.

Simultaneously, the counter punch 19 is moved by its drive 22 in the upward direction of arrow F until it engages the lower edge of the strip 7—see FIG. 6—from which position it is moved simulataneously with the severing punch 20 downwardly into the position shown in FIG. 7. Thus, simultaneously, at the upper side of the drum the plate 14 is severed and at the lower side of the drum a previously severed plate 14 is welded. The simultaneous severing at the upper side and welding at the lower side can be carried out with a speed that permits up to about 600 welds per minute. The working cycle can be speeded up to the limit of the spot welding cycle and is limited only by the time to effect rapid spot welding. The precision of placement and welding of the contact plate on the carrier is excellent since the time during which the drum is stationary, the strip 5 is simultaneously stationary. Both drum and strip are locked with respect to each other. Uniform distribution of the openings 13 about the drum, accurate placement of the transport appertures 28 and synchronized movement, for example electrically or mechanically controlled by cams, insures uniform distances and uniform placement of the contact plates on the carrier, with respect to each other, as well as with respect to the edge of the carrier strip 5.

The accuracy of positioning is further insured by the resilient coupling of the drum and the means to compensate for varying play, or to readjust the accuracy of rotation and true centering of the drum during extended operating time.

The contact elements can be severed from suitable supply sources which may be in rod form, wire form, strip or tape form, or the like. The position of the contact plates on the carrier strip can be readily changed, for example by movement of the table 2 about its pivot pin 4. Two or more contacts can be simultaneously applied to a carrier strip. The drum can have a relatively small diameter, just sufficiently large to receive a welding electrode and a counter punch 19 therein. The overall dimension of the drum thus can be held small, the transport paths are small, and the inertia of the movable elements can be held down, thus increasing the operating speed. The plate itself can be tiny—dimensions of 3 mm at the surface or less, and dimensions of less than 1 mm maximum, for example circular, or square (measured diagonally) are readily accepted by the apparatus. To vary the shape of the contact, and to permit acceptance of different types or differently shaped contact plates 14, the openings 13 are preferably defined by separate opening bushings 13*a* (FIG. 5) in which the opening is matched to the shape of the plate being applied. Of course, the punch and counter-punch elements, as well as the welding electrodes likewise have to be fitted to the shape and size of the opening within the bushing 13*a*. The cutter counter edge is preferably adjustably secured in the apparatus to permit accurate matching of the position of the cut-off edge 30 with respect to the specific punch 20 used with a specifically shaped contact plate.

The position of the contact plate on the carrier 5 can be suitably selected and readily adjusted by moving the table 2 about its pivot axis 4. Two or more contacts can be simultaneously applied to the same carrier 5. The drum can be formed with a relatively small diameter, just sufficient to accept the welding electrode 18 and a punch counter element 19. The distances through which the various elements have to move are small and due to the resulting possibility to use small dimensions throughout, the overall inertia of the various elements can be reduced, by further increasing the operating speed. The size of the contact being applied can be small; plates of 3 mm maximum surface dimension can readily be handled. Plates of maximum dimension of 1 mm, or less, are a typical field of application of the apparatus.

The central position of the welding bump 31 provides for excellent and rapid transmission of welding current without interfering with possible coatings or precious metal contact layers on the strip 7. Such contact layers would be applied at the side which will be the facing contact element when the plate is applied, and on the material 7 would be at the lower side thereof, with respect to FIGS. 6, 7. This is particularly important if contacts of noble or precious metal are to be welded. Such contacts are frequently used in relays, such as reed relays. The present invention is not limited to such structures but can also be used for contacts or contact surfaces applied to carriers for semiconductors, integrated circuits and the like. The welding bump need not be applied in the same apparatus as the severing and welding portion thereof, with which the deformation punch 23 can be combined.

FIG. 10 illustrates an example in which the opening 37 is laterally open at one side. Rather than using bushings 13*a* defining a continuously surrounded opening therethrough, that is, for example a cylindrical opening with a conical inner flare 15, the insert bushings or sleeves can be formed in the shape of longitudinal holders 33. The holders 33 are located in grooves 34 formed at the facing side of the drum 9′, to be readily accessible at the circumference thereof. The grooves 34 are placed at suitable distances from each other. The holders 33 are removably positioned in the grooves 34 by screws 35.

The contact plates 14′ are held in recesses 37 of the holder 33. The holders 33 have a spring, typically a leaf spring 36 secured thereto to resiliently press the plates 14 into the opening and hold the plates 14 therein by frictional engagement. The spring 36 is a leaf spring as seen in FIG. 10, is movable from right towards the left in a small notch 38 formed in a holder 33 to resiliently hold plates 14′ and permit release of the plate 14′ at the welding position.

When the opening 37 is empty, the spring 10 is at the left extreme position. Upon insertion of a plate 14, that is, upon punching and severing of the plate 14 from a strip, rod, or wire 7, spring 36 is moved toward the right. The leaf spring effects excellent clamping of the plate 14 and is easily placed and adjusted. The leaf spring need not move in a circumferential direction. It can also be arranged at right angles with respect to the position shown in FIG. 10, that is, to provide for axial clamping of the plate 14. More than one leaf spring may be used, one each in a respectively transverse direction to securely hold the plate 14 in its respective recess.

Various changes and modifications may be made, and features described in connection with any one of the embodiments may be used with any of the others, within the scope of the inventive concept.

We claim:

1. Contact welding machine to apply contact terminal plates (14) to predetermined locations on a carrier strip (5) having supply means (6; 29) feeding the carrier to a welding position;

contact material supply means (8) feeding contact material (7) in elongated filamentary or strip form to a severing position, said machine comprising in accordance with the invention, a transport drum (9) formed at its circumference with contact plate receiving openings (13, 37);

severing punch means (20) located at the contact severing position and adjacent the outer circumference of the drum to sever a terminal plate (FIGS. 1–9: 14; FIG. 10: 14′) from the elongated contact material (7);

a punch counter element (19) located within the drum (9, 9′); the punch counter element being positioned with respect to the punch means (20) at the severing position and the elongated contact material to sever a contact plate, upon operation of the punch means, from said elongated contact material and place the severed plate into one of said plate receiving openings (13, 37) of the drum;

an inner welding element (18) located within the drum (9, 9′);

an outer welding electrode (16) located adjacent the outer circumference of the drum opposite the inner electrode and at the welding position, said welding position being located circumferentially offset with respect to the contact severing position;

operating means (21, 22) operably connected to said punch counter element (19) and to the inner welding electrode element (18), respectively, to move the respective elements radially with respect to the drum;

means (2′) guiding said carrier strip to the welding position;

and drum rotation means (10) to rotate the drum coupled to the drum.

2. Machine according to claim 1, wherein said contact plate receiving openings (13, 37) have a uniform distance from the end face of the drum (9, 9′).

3. Machine according to claim 1, wherein (FIG. 4) the drum (9) is formed with a plurality of parallel rows of contact plate receiving openings (13, 13′).

4. Machine according to claim 1, wherein the distance between adjacent contact plate receiving openings (13, 13′) along the circumference of the drum (9, 9′) is uniform.

5. Machine according to claim 1, wherein the contact receiving openings (13) are conically flared towards the interior of the drum.

6. Machine according to claim 1, further including a deforming punch element (23) located, with respect to the transport direction of said supply means feeding the contact material, in advance of the severing punch (20), the deforming element being shaped to form a welding bump (31) on the contact material (7).

7. Machine according to claim 1, wherein the supply means feeding the contact material (7) to the drums is located to feed the contact material is an essentially tangential direction with respect to the circumference of the drum.

8. Machine according to claim 1, wherein the supply means feeding the carrier (5) to the welding position, and the supply means feeding the contact material (7) to the severing position supply the respective carrier (5) and contact material (7) in essentially parallel planes to the drum, said drums being spaced from each other essentially by the diameter of the drum (9, 9').

9. Machine according to claim 1, wherein the supply means feeding the contact material (7) supplies said elongated contact material in a direction parallel to the axis of rotation of the drum (9, 9').

10. Machine according to claim 1, wherein the supply means feeding the contact material (7) supplies said elongated contact material in a direction at an angle with respect to the axis of rotation of the drum (9, 9').

11. Machine according to claim 1, wherein the supply means feeding the contact material (7) to the drum supplies said contact material in a direction perpendicular to the axis of rotation of the drum.

12. Machine according to claim 1, wherein the severing punch means (20) is located above the drum (9);
the outer welding electrode (16) is located below the drum (9, 9');
and both welding electrodes and the severing punch means and punch counter elements are located in the vertical alignment.

13. Machine according to claim 1, further including stepped feeding means (28, 29; A; 24, H) feeding the respective carrier (5) and contact material (7) in synchronism, feed of the respective carrier and contact material, and rotation of the drum (I) by the drum rotation means being synchronized.

14. Machine according to claim 1, wherein the drum is formed with a radial bore (12) for placement therein of least one centering bolt for adjustment of true centered operation of said drum (9).

15. Machine according to claim 1, wherein the supply means feeding the carrier (5) to the welding position, and the drum, severing punch means, punch counter element, and welding electrodes are relatively movable with respect to each other about a longitudinal axis extending through said welding electrodes (16, 18).

16. Machine according to claim 1, wherein the drum is formed with bushings, said bushings defining the openings, said bushings (13*a*) being selectively replaceably positioned in the drum.

17. Machine according to claim 1, further comprising (FIG. 10) insert means (13*a*, 33), said insert means being formed with said openings (13, 37), said openings being larger than the plates (14, 14') to be placed therein;
and resilient holding means (36) extending into said openings to resiliently clamp a plate (14, 14') received in said openings.

18. Machine according to claim 17, wherein the resilient holding means comprises a leaf spring.

19. Machine according to claim 17, wherein said opening (37) is open towards the face of the drum.

20. Machine according to claim 1, wherein movement of the severing punch means (20) and the punch counter element (19) and of the inner welding electrode element and the outer welding electrode element (16) is synchronized and occurs simultaneously to effect simultaneous severing of a plate from the contact material (7) at the severing position and welding of a previously severed plate transported by said drum to the welding position.

21. Machine according to claim 20, wherein rotation of the drum by said drum rotation means, feed of the contact material and feed of the carrier (5) are synchronized to occur simultaneously and subsequent to a simultaneous severing and welding operation, indexing movement of the drum by one opening, and feed and severing and welding forming one operating cycle.

22. Machine according to claim 1, wherein the severing punch means punches a plate having a maximum surface dimension of 3 mm.

23. Machine according to claim 22, wherein said maximum surface dimension is 1 mm.

24. Machine according to claim 6, wherein the deforming punch element (23) places the welding bump (31) centrally on the contact material at the side where the contact material is to be welded to the carrier strip (5).

25. Machine according to claim 1, wherein the drum rotation means (10) comprises a shaft formed with an abutment;
and a compensating resilient coupling is provided, secured to the shaft and including spring means (27) engaging the drum (9) and pressing the drum against the abutment on the shaft.

* * * * *